United States Patent
Berzinis et al.

(10) Patent No.: US 7,049,368 B2
(45) Date of Patent: May 23, 2006

(54) IMPACT-MODIFIED COMPOSITIONS AND METHOD

(75) Inventors: Albin Peter Berzinis, Marietta, OH (US); Satish Kumar Gaggar, Parkersburg, WV (US)

(73) Assignee: General Electric, Pittsfield, MA (US)

(*) Notice: Subject to any disclaimer, the term of this patent is extended or adjusted under 35 U.S.C. 154(b) by 0 days.

(21) Appl. No.: 10/748,394

(22) Filed: May 5, 2004

(65) Prior Publication Data

US 2004/0225069 A1 Nov. 11, 2004

Related U.S. Application Data

(63) Continuation-in-part of application No. 10/434,914, filed on May 9, 2003.

(51) Int. Cl.
*C08L 51/04* (2006.01)
*C08L 33/02* (2006.01)

(52) U.S. Cl. .............................. 525/63; 525/69; 525/71; 525/113; 525/221; 525/227; 525/230; 525/238; 525/241

(58) Field of Classification Search ................ 525/63, 525/69, 71, 113, 221, 227, 230, 238, 241
See application file for complete search history.

(56) References Cited

U.S. PATENT DOCUMENTS

| | | | |
|---|---|---|---|
| 3,944,631 A | | 3/1976 | Yu et al. |
| 3,957,916 A | | 5/1976 | Tanno et al. |
| 4,111,876 A | | 9/1978 | Bailey et al. |
| 4,224,419 A | * | 9/1980 | Swoboda et al. ............... 525/71 |
| 4,351,921 A | | 9/1982 | Kishida et al. |
| 4,634,734 A | | 1/1987 | Hambrecht et al. |
| 4,788,253 A | | 11/1988 | Hambrecht et al. |
| 5,068,285 A | * | 11/1991 | Laughner ....................... 525/67 |
| 5,580,924 A | | 12/1996 | Wildi et al. |
| 5,965,665 A | | 10/1999 | Fukuyama et al. |
| 6,331,580 B1 | * | 12/2001 | Molnar ......................... 523/201 |
| 6,566,457 B1 | * | 5/2003 | Barghoorn et al. ............ 525/339 |
| 6,720,386 B1 | * | 4/2004 | Gaggar et al. ................. 525/85 |
| 2004/0225034 A1 | * | 11/2004 | Berzinis ........................ 525/63 |

FOREIGN PATENT DOCUMENTS

| | | |
|---|---|---|
| EP | 0913408 | 5/1999 |
| JP | 52-33656 | 8/1977 |
| JP | 59-108056 | 6/1984 |
| JP | 62-151442 | 7/1987 |
| JP | 9-272783 | 8/1998 |
| JP | 11-240925 | 7/1999 |
| JP | 2001-40160 | 2/2001 |
| WO | WO 03/004542 | 1/2003 |

OTHER PUBLICATIONS

U.S. Appl. No. 08/962,458, filed Oct. 31, 1997—08CQ5741.
U.S. Appl. No. 10/771,520, filed Feb. 4, 2004.

* cited by examiner

*Primary Examiner*—James J. Seidleck
*Assistant Examiner*—Olga Asinovsky (57) ABSTRACT

The present invention relates to a rubber modified thermoplastic resin composition comprising a discontinuous elastomeric phase dispersed in a rigid thermoplastic phase, wherein at least a portion of the rigid thermoplastic phase is grafted to the elastomeric phase, which is prepared by a method comprising the steps of: (a) polymerizing a mixture of monomers in a first stage in the presence of the elastomeric phase, at least one of which monomers is selected from the group consisting of vinyl aromatic monomers and at least one of which monomers is selected from the group consisting of monoethylenically unsaturated nitrile monomers, followed by (b) polymerizing one or more monomers in at least one subsequent stage in the presence of the elastomeric phase from (a), wherein the one or more monomers comprise at least one monomer selected from the group consisting of $(C_1-C_{12})$alkyl- and aryl-(meth)acrylate monomers. The method is also provided.

58 Claims, 5 Drawing Sheets

% of total graft monomer being SAN 1st shell

FIG. 5

IMPACT-MODIFIED COMPOSITIONS AND METHOD

CROSS-REFERENCE TO RELATED APPLICATIONS

This application is a continuation-in-part of application Ser. No. 10/434,914, filed May 9, 2003, which is incorporated herein by reference.

BACKGROUND OF THE INVENTION

For reasons of an excellent balance of impact strength, flow and chemical resistance a wide variety of commercial rubber-modified blends are based on styrene-acrylonitrile (SAN) copolymers. The widest commercial utility of such products is found when the rubber impact modifier phase is polybutadiene (PBD) to create the family of resins known as ABS. In order to improve the retention of impact strength and appearance upon outdoor exposure, styrene-acrylonitrile compositions comprising at least one alkyl acrylate, such as poly(butyl acrylate) (PBA) rubbers, are prepared, known as ASA (acrylonitrile-styrene-acrylate).

However, the styrene-acrylonitrile matrix polymers are significantly less stable to conditions of outdoor exposure than the PBA rubber substrate, since the styrenic structural units are more prone to photo-oxidation. Thus, systems based on styrene-acrylonitrile including ASA tend to show a tendency over time towards yellowing and chalking of the surface when exposed to actual or simulated outdoor exposure. It is well known in the art that hindered amine light stabilizers (HALS) may be added to resinous compositions in an attempt to retard the undesirable photochemistry. However, at some point the HALS is consumed at the surface of the article and yellowing can then ensue with further outdoor exposure. Thus, even ASA systems based on the more stable PBA rubber and containing HALS still show some degree of color shift and gloss loss during outdoor exposure.

By contrast, the class of impact-modified blends based on poly(methyl methacrylate) (PMMA) as the continuous rigid phase and an impact modifier based on a weatherable PBA rubber are well-recognized for showing minimal shift in color on exposure to real or simulated outdoor aging and also excellent retention of surface gloss under the same conditions. However, these blends are also often characterized by relatively low impact strength and stiff flow. It would be beneficial to prepare compositions having the impact strength and other advantageous properties associated with compositions comprising styrene-acrylonitrile matrix polymers and rubbery impact modifiers while obtaining the improved weatherability properties associated with compositions comprising PMMA. One approach to solving this problem involves incorporating methyl methacrylate or related monomer onto the rubber or elastomeric portion of the ASA composition. However, it has been found that grafting of methyl methacrylate is not efficient and that impact strength is decreased in the resulting compositions comprising grafted elastomeric phase and styrene-acrylonitrile matrix polymer. Therefore, a problem to be solved is to devise an efficient method for incorporating an acrylate or methacrylate monomer into compositions comprising a rigid phase and impact modifying elastomeric phase with optimum efficiency of incorporation resulting in compositions of improved weathering performance and optimum impact strength.

BRIEF DESCRIPTION OF THE INVENTION

The present invention relates to rubber modified thermoplastic resins which show a surprising level of improvement in weathering performance with retention of an attractive balance of good melt flow and excellent impact strength.

In a particular embodiment the present invention relates to a method for preparing a rubber modified thermoplastic resin comprising a discontinuous elastomeric phase dispersed in a rigid thermoplastic phase, wherein at least a portion of the rigid thermoplastic phase is grafted to the elastomeric phase, which comprises the steps of:

(a) polymerizing a mixture of monomers in a first stage in the presence of the elastomeric phase, at least one of which monomers is selected from the group consisting of vinyl aromatic monomers and at least one of which monomers is selected from the group consisting of monoethylenically unsaturated nitrile monomers, followed by (b) polymerizing one or more monomers in at least one subsequent stage in the presence of the elastomeric phase from (a), wherein the one or more monomers comprise at least one monomer selected from the group consisting of ($C_1$–$C_{12}$)alkyl- and aryl-(meth)acrylate monomers.

In another embodiment the present invention relates to a rubber modified thermoplastic resin composition prepared by the method comprising the steps described. Various other features, aspects, and advantages of the present invention will become more apparent with reference to the following description and appended claims.

DETAILED DESCRIPTION OF THE INVENTION

In various embodiments the method of the present invention provides a rubber modified thermoplastic resin comprising a discontinuous elastomeric phase and a rigid thermoplastic phase wherein at least a portion of the rigid thermoplastic phase is grafted to the elastomeric phase. The method of the present invention employs at least one rubber substrate for grafting. The rubber substrate comprises the discontinuous elastomeric phase of the composition. There is no particular limitation on the rubber substrate provided it is susceptible to grafting by at least a portion of a graftable monomer. The rubber substrate has a glass transition temperature, Tg, in one embodiment below about 0° C., in another embodiment below about minus 20° C., and in still another embodiment below about minus 30° C.

In various embodiments the rubber substrate is derived from polymerization by known methods of at least one monoethylenically unsaturated alkyl (meth)acrylate monomer selected from ($C_1$–$C_{12}$)alkyl(meth)acrylate monomers and mixtures comprising at least one of said monomers. As used herein, the terminology "monoethylenically unsaturated" means having a single site of ethylenic unsaturation per molecule, and the terminology "(meth)acrylate monomers" refers collectively to acrylate monomers and methacrylate monomers. As used herein, the terminology "$(C_x-C_y)$", as applied to a particular unit, such as, for example, a chemical compound or a chemical substituent group, means having a carbon atom content of from "x" carbon atoms to "y" carbon atoms per such unit. For example, "$(C_1-C_{12})$alkyl" means a straight chain, branched or cyclic alkyl substituent group having from 1 to 12 carbon atoms per group and includes, but is not limited to, methyl, ethyl, n-propyl, iso-propyl, n-butyl, sec-butyl, t-butyl, pentyl, hexyl, heptyl, octyl, nonyl, decyl, undecyl and dodecyl. Suitable $(C_1-C_{12})$alkyl(meth)acrylate monomers include, but are not limited to $(C_1-C_{12})$alkyl acrylate monomers, illustrative examples of which include ethyl acrylate, butyl acrylate, iso-pentyl acrylate, n-hexyl acrylate, and 2-ethyl hexyl acrylate; and their $(C_1-C_{12})$alkyl methacrylate analogs illustrative examples of which include methyl methacrylate, ethyl methacrylate, propyl methacrylate, iso-propyl methacrylate, butyl methacrylate, hexyl methacrylate, and decyl methacrylate. In a particular embodiment of the present invention the rubber substrate comprises structural units derived from n-butyl acrylate.

In various embodiments the rubber substrate may also comprise structural units derived from at least one polyethylenically unsaturated monomer. As used herein, the terminology "polyethylenically unsaturated" means having two or more sites of ethylenic unsaturation per molecule. A polyethylenically unsaturated monomer is often employed to provide cross-linking of the rubber particles and to provide "graftlinking" sites in the rubber substrate for subsequent reaction with grafting monomers. Suitable polyethylenic unsaturated monomers include, but are not limited to, butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylcyanurate, triallylisocyanurate, the acrylate of tricyclodecenylalcohol and mixtures comprising at least one of such monomers. In a particular embodiment the rubber substrate comprises structural units derived from triallylcyanurate.

In some embodiments the rubber substrate may optionally comprise structural units derived from minor amounts of other unsaturated monomers, for example those that are copolymerizable with an alkyl (meth)acrylate monomer used to prepare the rubber substrate. Suitable copolymerizable monomers include, but are not limited to, $C_1-C_{12}$ aryl or haloaryl substituted acrylate, $C_1-C_{12}$ aryl or haloaryl substituted methacrylate, or mixtures thereof; monoethylenically unsaturated carboxylic acids, such as, for example, acrylic acid, methacrylic acid and itaconic acid; glycidyl (meth)acrylate, hydroxy alkyl (meth)acrylate, hydroxy $(C_1-C_{12})$alkyl (meth)acrylate, such as, for example, hydroxyethyl methacrylate; $(C_4-C_{12})$cycloalkyl (meth)acrylate monomers, such as, for example, cyclohexyl methacrylate; (meth)acrylamide monomers, such as, for example, acrylamide, methacrylamide and N-substituted-acrylamide or -methacrylamides; maleimide monomers, such as, for example, maleimide, N-alkyl maleimides, N-aryl maleimides and haloaryl substituted maleimides; maleic anhydride; vinyl methyl ether, vinyl esters, such as, for example, vinyl acetate and vinyl propionate. As used herein, the term "(meth)acrylamide" refers collectively to acrylamides and methacrylamides. Suitable copolymerizable monomers also include, but are not limited to, vinyl aromatic monomers, such as, for example, styrene and substituted styrenes having one or more alkyl, alkoxy, hydroxy or halo substituent groups attached to the aromatic ring, including, but not limited to, alpha-methyl styrene, p-methyl styrene, 3,5-diethylstyrene, 4-n-propylstyrene, vinyl toluene, alpha-methyl vinyltoluene, vinyl xylene, trimethyl styrene, butyl styrene, t-butyl styrene, chlorostyrene, alpha-chlorostyrene, dichlorostyrene, tetrachlorostyrene, bromostyrene, alpha-bromostyrene, dibromostyrene, p-hydroxystyrene, p-acetoxystyrene, methoxystyrene and vinyl-substituted condensed aromatic ring structures, such as, for example, vinyl naphthalene, vinyl anthracene, as well as mixtures of vinyl aromatic monomers and monoethylenically unsaturated nitrile monomers such as, for example, acrylonitrile, ethacrylonitrile, methacrylonitrile, alpha-bromoacrylonitrile and alpha-chloro acrylonitrile. Substituted styrenes with mixtures of substituents on the aromatic ring are also suitable The rubber substrate may be present in compositions of the invention in one embodiment at a level of from about 10 to about 94 percent by weight; in another embodiment at a level of from about 10 to about 80 percent by weight; in another embodiment at a level of from about 15 to about 80 percent by weight; in another embodiment at a level of from about 35 to about 80 percent by weight; in another embodiment at a level of from about 40 to about 80 percent by weight; in another embodiment at a level of from about 25 to about 60 percent by weight, and in still another embodiment at a level of from about 40 to about 50 percent by weight based on the total weight of the composition. In other embodiments the rubber substrate may be present in compositions of the invention at a level of from about 5 to about 50 percent by weight; at a level of from about 8 to about 40 percent by weight; or at a level of from about 10 to about 30 percent by weight based on the total weight of the composition.

There is no particular limitation on the particle size distribution of the rubber substrate (sometimes referred to hereinafter as initial rubber substrate to distinguish it from the rubber substrate following grafting). In some embodiments the rubber substrate may possess a broad particle size distribution with particles ranging in size from about 50 nm to about 1000 nm. In other embodiments the mean particle size of the rubber substrate may be less than about 100 nm. In still other embodiments the mean particle size of the rubber substrate may be in a range of between about 80 nm and about 500 nm. In still other embodiments the mean particle size of the rubber substrate may be in a range of between about 200 nm and about 750 nm. In other embodiments the mean particle size of the rubber substrate may be greater than about 400 nm.

In one aspect of the present invention monomers are polymerized in the presence of the rubber substrate to thereby form a graft copolymer, at least a portion of which is chemically grafted to the rubber phase. Any portion of graft copolymer not chemically grafted to rubber substrate comprises the rigid thermoplastic phase. The rigid thermoplastic phase comprises a thermoplastic polymer or copolymer that exhibits a glass transition temperature (Tg) in one embodiment of greater than about 25° C., in another embodiment of greater than or equal to 90° C., and in still another embodiment of greater than or equal to 100° C.

In a particular embodiment the rigid thermoplastic phase comprises a polymer having structural units derived from one or more monomers selected from the group consisting of $(C_1-C_{12})$alkyl- and aryl-(meth)acrylate monomers, vinyl aromatic monomers and monoethylenically unsaturated nitrile monomers. Suitable $(C_1-C_{12})$alkyl- and aryl-(meth)acrylate monomers, vinyl aromatic monomers and monoethylenically unsaturated nitrile monomers include those set forth hereinabove in the description of the rubber substrate. Examples of such polymers include, but are not limited to, a styrene/acrylonitrile copolymer, an alpha-methylstyrene/acrylonitrile copolymer, a styrene/methylmethacrylate copolymer, a styrene/maleic anhydride copolymer or an alpha-methylstyrene/styrene/acrylonitrile-, a styrene/acrylonitrile/methylmethacrylate-, a styrene/acrylonitrile/maleic anhydride- or a styrene/acrylonitrile/acrylic acid-terpolymer, or an alpha-methylstyrene/styrene/acrylonitrile terpolymer. These copolymers may be used for the rigid thermoplastic phase either individually or as mixtures.

In some embodiments the rigid thermoplastic phase comprises one or more vinyl aromatic polymers. Suitable vinyl aromatic polymers comprise at least about 20 wt. % structural units derived from one or more vinyl aromatic monomers. In a particular embodiment the rigid thermoplastic phase comprises a vinyl aromatic polymer having first structural units derived from one or more vinyl aromatic monomers and having second structural units derived from one or more monoethylenically unsaturated nitrile monomers. Examples of such vinyl aromatic polymers include, but are not limited to, a styrene/acrylonitrile copolymer, an alpha-methylstyrene/acrylonitrile copolymer, or an alpha-methylstyrene/styrene/acrylonitrile terpolymer. In another particular embodiment the rigid thermoplastic phase comprises a vinyl aromatic polymer having first structural units derived from one or more vinyl aromatic monomers; second structural units derived from one or more monoethylenically unsaturated nitrile monomers; and third structural units derived from one or more monomers selected from the group consisting of $(C_1-C_{12})$alkyl- and aryl-(meth)acrylate monomers. Examples of such vinyl aromatic polymers include, but are not limited to, styrene/acrylonitrile/methyl methacrylate copolymer and alpha-methylstyrene/acrylonitrile/methyl methacrylate copolymer. These copolymers may be used for the rigid thermoplastic phase either individually or as mixtures.

When structural units in copolymers are derived from one or more monoethylenically unsaturated nitrile monomers, then the nitrile monomer content in the copolymer comprising the graft copolymer and the rigid thermoplastic phase may be in one embodiment in a range of between about 5 and about 40 percent by weight, in another embodiment in a range of between about 5 and about 30 percent by weight, in another embodiment in a range of between about 10 and about 30 percent by weight, and in yet another embodiment in a range of between about 15 and about 30 percent by weight, based on the weight of the copolymer comprising the graft copolymer and the rigid thermoplastic phase.

The amount of grafting that takes place between the rubber phase and monomers comprising the rigid thermoplastic phase varies with the relative amount and composition of the rubber phase. In one embodiment, greater than about 10 wt % of the rigid thermoplastic phase is chemically grafted to the rubber, based on the total amount of rigid thermoplastic phase in the composition. In another embodiment, greater than about 15 wt % of the rigid thermoplastic phase is chemically grafted to the rubber, based on the total amount of rigid thermoplastic phase in the composition. In still another embodiment, greater than about 20 wt % of the rigid thermoplastic phase is chemically grafted to the rubber, based on the total amount of rigid thermoplastic phase in the composition. In particular embodiments the amount of rigid thermoplastic phase chemically grafted to the rubber may be in a range of between about 5% and about 90 wt %; between about 10% and about 90 wt %; between about 15% and about 85 wt %; between about 15% and about 50 wt %; or between about 20% and about 50 wt %, based on the total amount of rigid thermoplastic phase in the composition. In yet other embodiments, about 40 to 90 wt % of the rigid thermoplastic phase is free, that is, non-grafted.

The rigid thermoplastic phase may be present in compositions of the invention in one embodiment at a level of from about 85 to about 6 percent by weight; in another embodiment at a level of from about 65 to about 6 percent by weight; in another embodiment at a level of from about 60 to about 20 percent by weight; in another embodiment at a level of from about 75 to about 40 percent by weight, and in still another embodiment at a level of from about 60 to about 50 percent by weight based on the total weight of the composition. In other embodiments rigid thermoplastic phase may be present in compositions of the invention in a range of between about 90% and about 30 wt %, based on the total weight of the composition.

The rigid thermoplastic phase may be formed solely by polymerization carried out in the presence of rubber substrate or by addition of one or more separately polymerized rigid thermoplastic polymers to a rigid thermoplastic polymer that has been polymerized in the presence of the rubber substrate. When at least a portion of separately synthesized rigid thermoplastic phase is added to compositions, then the amount of said separately synthesized rigid thermoplastic phase added is in an amount in a range of between about 30 wt. % and about 80 wt. % based on the weight of the entire composition. Two or more different rubber substrates each possessing a different mean particle size may be separately employed in such a polymerization reaction and then the products blended together. In illustrative embodiments wherein such products each possessing a different mean particle size of initial rubber substrate are blended together, then the ratios of said substrates may be in a range of about 90:10 to about 10:90, or in a range of about 80:20 to about 20:80, or in a range of about 70:30 to about 30:70. In some embodiments an initial rubber substrate with smaller particle size is the major component in such a blend containing more than one particle size of initial rubber substrate.

The rigid thermoplastic phase may be made according to known processes, for example, mass polymerization, emulsion polymerization, suspension polymerization or combinations thereof, wherein at least a portion of the rigid thermoplastic phase is chemically bonded, i.e., "grafted" to the rubber phase via reaction with unsaturated sites present in the rubber phase. The grafting reaction may be performed in a batch, continuous or semi-continuous process. Representative procedures include, but are not limited to, those taught in U.S. Pat. No. 3,944,631; and U.S. patent application Ser. No. 08/962,458, filed Oct. 31, 1997. The unsaturated sites in the rubber phase are provided, for example, by residual unsaturated sites in those structural units of the rubber that were derived from a graftlinking monomer.

In embodiments of the present invention monomer grafting to rubber substrate with concomitant formation of rigid thermoplastic phase is performed in stages wherein at least one first monomer is grafted to rubber substrate followed by at least one second monomer different from said first monomer. In the present context the change from one graft stage to the next is defined as that point where there is a change in the identity of at least one monomer added to the rubber substrate for grafting. In one embodiment of the present invention formation of rigid thermoplastic phase and grafting to rubber substrate are performed by feeding at least one first monomer over time to a reaction mixture comprising rubber substrate. In this context a second graft stage occurs when a different monomer is introduced into the feed stream in the presence or absence of said first monomer.

At least two stages are employed for grafting, although additional stages may be employed. The first graft stage is performed with one or more monomers selected from the group consisting of vinyl aromatic monomers and monoethylenically unsaturated nitrile monomers. In a particular embodiment grafting is performed in a first stage with a mixture of monomers, at least one of which is selected from the group consisting of vinyl aromatic monomers and at least one of which is selected from the group consisting of monoethylenically unsaturated nitrile monomers. When at least one vinyl aromatic monomer and at least one monoethylenically unsaturated nitrile monomer are employed in the first graft stage, then the wt./wt. ratio of vinyl aromatic monomer to monoethylenically unsaturated nitrile monomer is in one embodiment in a range of between about 1:1 and about 6:1, in another embodiment in a range of between about 1.5:1 and about 4:1, in still another embodiment in a range of between about 2:1 and about 3:1, and in still another embodiment in a range of between about 2.5:1 and about 3:1. In one preferred embodiment the wt./wt. ratio of vinyl aromatic monomer to monoethylenically unsaturated nitrile monomer employed in the first graft stage is about 2.6:1.

In at least one subsequent stage following said first stage, grafting is performed with one or more monomers selected from the group consisting of $(C_1-C_{12})$alkyl- and aryl-(meth)acrylate monomers, vinyl aromatic monomers and monoethylenically unsaturated nitrile monomers. In a particular embodiment grafting is performed in at least one subsequent stage with one or more monomers, at least one of which is selected from the group consisting of $(C_1-C_{12})$alkyl- and aryl-(meth)acrylate monomers. In another particular embodiment grafting is performed in at least one subsequent stage with a mixture of monomers, at least one of which is selected from the group consisting of $(C_1-C_{12})$alkyl- and aryl-(meth)acrylate monomers and at least one of which is selected from the group consisting of vinyl aromatic monomers and monoethylenically unsaturated nitrile monomers. In another particular embodiment grafting is performed in at least one subsequent stage with a mixture of monomers, one of which is selected from the group consisting of $(C_1-C_{12})$alkyl- and aryl-(meth)acrylate monomers; one of which is selected from the group consisting of vinyl aromatic monomers and one of which is selected from the group consisting of monoethylenically unsaturated nitrile monomers. Said $(C_1-C_{12})$alkyl- and aryl-(meth)acrylate monomers, vinyl aromatic monomers and monoethylenically unsaturated nitrile monomers include those described hereinabove.

In the first graft stage the amount of monomer employed for grafting to rubber substrate is in one embodiment in a range of between about 5 wt. % and about 98 wt. %; in another embodiment in a range of between about 5 wt. % and about 95 wt. %; in another embodiment in a range of between about 10 wt. % and about 90 wt. %; in another embodiment in a range of between about 15 wt. % and about 85 wt. %; in another embodiment in a range of between about 20 wt. % and about 80 wt. %; and in yet another embodiment in a range of between about 30 wt. % and about 70 wt. %, based on the total weight of monomer employed for grafting in all stages. In one particular embodiment the amount of monomer employed for grafting to rubber substrate in the first stage is in a range of between about 30 wt. % and about 95 wt. % based on the total weight of monomer employed for grafting in all stages. Further monomer is then grafted to rubber substrate in one or more stages following said first stage. In one particular embodiment all further monomer is grafted to rubber substrate in one second stage following said first stage.

When at least one $(C_1-C_{12})$alkyl- and aryl-(meth)acrylate monomer is employed for grafting to rubber substrate in a stage following the first stage, then the amount of said (meth)acrylate monomer is in one embodiment in a range of between about 95 wt. % and about 2 wt. %; in another embodiment in a range of between about 80 wt. % and about 2 wt. %; in another embodiment in a range of between about 70 wt. % and about 2 wt. %; in another embodiment in a range of between about 50 wt. % and about 2 wt. %; in another embodiment in a range of between about 45 wt. % and about 2 wt. %; and in yet another embodiment in a range of between about 40 wt. % and about 5 wt. %, based on the total weight of monomer employed for grafting in all stages.

When a mixture of monomers comprising at least one $(C_1-C_{12})$alkyl- and aryl-(meth)acrylate monomer is employed for grafting to rubber substrate in a stage following the first stage, then the wt./wt. ratio of said (meth)acrylate monomer to the totality of other monomers is in one embodiment in a range of between about 10:1 and about 1:10; in another embodiment in a range of between about 8:1 and about 1:8; in another embodiment in a range of between about 5:1 and about 1:5; in another embodiment in a range of between about 3:1 and about 1:3; in another embodiment in a range of between about 2:1 and about 1:2; and in yet another embodiment in a range of between about 1.5:1 and about 1:1.5.

The compositions of the present invention can be formed into useful articles. In some embodiments the articles are unitary articles comprising a composition of the present invention. In other embodiments the articles may comprise a composition of the present invention in combination with at least one other resin, including, but not limited to, styrenic polymers and copolymers, SAN, ABS, poly(meth)acrylate polymers and copolymers; copolymers derived from at least one vinyl aromatic monomer, at least one monoethylenically unsaturated nitrile monomer, and at least one (meth)acrylate monomer; poly(vinyl chloride), poly(phenylene ether), polycarbonate, polyester, polyestercarbonate, polyetherimide, polyimide, polyamide, polyacetal, poly(phenylene sulfide), and polyolefin. Such combinations may comprise a blend of a composition of the present invention with at least one other resin, or a multilayer article comprising at least one layer comprising a composition of the present invention.

Multilayer and unitary articles which can be made which comprise compositions made by the method of the present invention include, but are not limited to, articles for outdoor vehicle and device (OVAD) applications; exterior and interior components for aircraft, automotive, truck, military vehicle (including automotive, aircraft, and water-borne vehicles), scooter, and motorcycle, including panels, quarter panels, rocker panels, vertical panels, horizontal panels, trim, pillars, center posts, fenders, doors, decklids, trunklids, hoods, bonnets, roofs, bumpers, fascia, grilles, mirror housings, pillar appliques, cladding, body side moldings, wheel covers, hubcaps, door handles, spoilers, window frames, headlamp bezels, tail lamp housings, tail lamp bezels, license plate enclosures, roof racks, and running boards; enclosures, housings, panels, and parts for outdoor vehicles and devices; enclosures for electrical and telecommunication devices; outdoor furniture; aircraft components; boats and marine equipment, including trim, enclosures, and housings; outboard motor housings; depth finder housings, personal water-craft; jet-skis; pools; spas; hot-tubs; steps; step coverings; building and construction applications such as glazing, fencing, decking planks, roofs; siding, particularly vinyl siding applications; windows, floors, decorative window furnishings or treatments; wall panels, and doors; outdoor and indoor signs; enclosures, housings, panels, and parts for automatic teller machines (ATM); enclosures, housings, panels, and parts for lawn and garden tractors, lawn mowers, and tools, including lawn and garden tools; window and door trim; sports equipment and toys; enclosures, housings, panels, and parts for snowmobiles; recreational vehicle panels and components; playground equipment; articles made from plastic-wood combinations; golf course markers; utility pit covers; mobile phone housings; radio sender housings; radio receiver housings; light fixtures; lighting appliances; reflectors; network interface device housings; transformer housings; air conditioner housings; cladding or seating for public transportation; cladding or seating for trains, subways, or buses; meter housings; antenna housings; cladding for satellite dishes; and like applications. The invention further contemplates additional fabrication operations on said articles, such as, but not limited to, molding, in-mold decoration, baking in a paint oven, plating, lamination, and/or thermoforming.

Compositions used to make articles of the present invention may optionally comprise additives known in the art including, but not limited to, stabilizers, such as color stabilizers, heat stabilizers, light stabilizers, antioxidants, UV screeners, and UV absorbers; flame retardants, anti-drip agents, lubricants, flow promoters and other processing aids; plasticizers, antistatic agents, mold release agents, impact modifiers, fillers, and colorants such as dyes and pigments which may be organic, inorganic or organometallic; and like additives. Illustrative additives include, but are not limited to, silica, silicates, zeolites, titanium dioxide, stone powder, glass fibers or spheres, carbon fibers, carbon black, graphite, calcium carbonate, talc, mica, lithopone, zinc oxide, zirconium silicate, iron oxides, diatomaceous earth, calcium carbonate, magnesium oxide, chromic oxide, zirconium oxide, aluminum oxide, crushed quartz, clay, calcined clay, talc, kaolin, asbestos, cellulose, wood flour, cork, cotton and synthetic textile fibers, especially reinforcing fillers such as glass fibers, carbon fibers, and metal fibers. Often more than one additive is included in compositions of the invention, and in some embodiments more than one additive of one type is included. In a particular embodiment a composition further comprises an additive selected from the group consisting of colorants, dyes, pigments, lubricants, stabilizers, fillers and mixtures thereof. Said articles may be prepared by a variety of known processes such as, for example, profile extrusion, sheet extrusion, coextrusion, extrusion blow molding and thermoforming, and injection molding.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner.

COMPARATIVE EXAMPLES

Comparative examples were run employing a common graft polymerization process, such as that process taught in U.S. patent application Ser. No. 08/962,458, filed Oct. 31, 1997. In particular, 45 parts by weight of a poly(butyl acrylate) (PBA) rubber substrate was grafted with 55 parts by weight of a monomer mixture comprising 67:33(wt./wt.) styrene-acrylonitrile. In various comparative examples increasing portions of styrene-acrylonitrile (SAN) monomer mixture were replaced with up to 50 wt. % methyl methacrylate (MMA) while keeping the ratio of styrene:acrylonitrile constant at 72:28. The rubber substrates had been prepared by semi-batch polymerization procedures at three different rubber particle sizes from 100 nm to 450 nm mean particle size (as measured by capillary hydrodynamic fractionation). Characterization data for the various graft polymerization products are shown in Table 1. All values for wt. % gel represent the acetone-insoluble portion of the product, which typically comprises PBA and any additional monomer species grafted to PBA. All swell indices were determined using acetone. All molecular weights were determined by gel permeation chromatography (GPC) in tetrahydrofuran verus polyrene standards. Molecular weights in the following tables represent those for acetone-soluble SAN.

TABLE 1

| Rubber particle size | Parts MMA employed in 55 parts monomer mixture | Wt. % Gel in product | Swell index | Mn | Mw | Mw/Mn |
|---|---|---|---|---|---|---|
| 450 nm | 0 | 67 | 5.1 | 54160 | 241000 | 4.5 |
|  | 26 | 56 | 5.0 | 51400 | 258000 | 5.0 |
|  | 45 | 57 | 5.1 | 47600 | 247000 | 5.2 |
|  | 45 | 56 | 5.2 | 51000 | 268000 | 5.3 |
| 165 nm | 0 | 65 | 7.9 | 58600 | 231000 | 3.9 |
|  | 25 | 56 | 7.2 | 54300 | 238000 | 4.4 |
|  | 50 | 54 | 6.7 | 46700 | 242000 | 5.2 |
| 100 nm | 0 | 63 | 9.9 | 59700 | 263000 | 4.4 |
|  | 45 | 48 | 8.7 | 57100 | 239000 | 4.2 |
|  | 45 | 49 | 7.4 | 54200 | 246000 | 4.5 |

The SAN graft process without methyl methacrylate yields a % gel content of around 65% for these 45% rubber grafts, indicating about 20 parts of SAN have become chemically grafted to the PBA rubber substrate. As MMA is added to the graft monomer charge in place of SAN, the graft efficiency drops off significantly. This loss of graft efficiency is seen upon replacing only a quarter of the SAN graft monomer mixture with MMA. The extent of grafting also seems to be reduced when the rubber particle size is reduced, although it was difficult to obtain consistent % gel values at the 100 nm particle size once MMA was incorporated into the graft.

In addition, comparative examples were run employing a common graft polymerization process in which 45 parts by weight of a poly(butyl acrylate) (PBA) rubber substrate was grafted with 55 parts by weight of a monomer mixture comprising various % ratios (wt./wt./wt. totaling 100) of styrene-acrylonitrile-methyl methacrylate. The rubber substrate in each case was prepared by a continuous procedure and comprised a broad rubber particle size distribution. Table 2 shows the amounts of styrene, acrylonitrile and methyl methacrylate present in each graft reaction and characterization data for the resulting product. Viscosities were determined at various shear rates using a Kayeness capillary rheometer under conditions of 260° C. melt temperature. Molded part impact strength values are also shown.

TABLE 2

| | Entry # | | | | |
|---|---|---|---|---|---|
| | 1 | 2 | 3 | 4 | 5 |
| Parts styrene | 67 | 75 | 40 | 40 | 40 |
| Parts acrylonitrile | 33 | 25 | 25 | 20 | 15 |
| Parts MMA | 0 | 0 | 35 | 40 | 45 |
| Wt. % Gel in product | 66 | 62 | 57 | 56 | 55 |
| Swell index | 7.6 | 6.6 | 6.4 | 6.2 | 5.8 |
| Mn | 54500 | 56300 | 48600 | 53100 | 55900 |
| Mw | 248000 | 242000 | 246000 | 249000 | 249000 |
| Mw/Mn | 4.6 | 4.3 | 5.1 | 4.7 | 4.5 |
| Viscosity, Pa · s | | | | | |
| at 1500 s$^{-1}$ | 159 | 151 | 145 | 136 | 126 |
| at 1000 s$^{-1}$ | 222 | 205 | 197 | 180 | 165 |
| at 500 s$^{-1}$ | 372 | 361 | 316 | 321 | 273 |
| at 100 s$^{-1}$ | 1209 | 1164 | 1055 | 1035 | 848 |
| at 50 s$^{-1}$ | — | 1863 | 1692 | 1658 | 1334 |
| Notched Izod Impact (kJ/m2) | 14.4 | 13.0 | 8.8 | 7.3 | 6.7 |
| Dynatup Impact Total Energy (Joules) | 14.4 | 16.6 | 4.5 | 1.7 | 2.3 |

As MMA is substituted for styrene at the same acrylonitrile content (entry 3 compared to entry 2), the graft efficiency drops significantly. Entry 4 shows that at comparable styrene level further reduction of the acrylonitrile content by replacing it with MMA leads to further but slight reduction in graft efficiency. The graft efficiency to the PBA substrate also depends on the acrylonitrile content as well as the MMA content. For example, entry 2, containing no MMA but a reduced level of acrylonitrile compared to entry 1 shows a reduced level of grafting.

The reduction in graft efficiency of a styrene-acrylonitrile-comprising monomer mixture onto rubber substrate has a negative effect on the impact strength of molded test specimens. Molded test specimens were prepared comprising 59 parts of grafted rubber substrates from Table 2 having a broad rubber particle size distribution, 33 parts of a rigid styrenic polymer (a conventional bulk-prepared styrene-acrylonitrile copolymer having an S:AN ratio of about 72:28), along with 8 parts of a crosslinked SAN polymer (referred to hereinafter as "crosslinked SAN polymer") as a gloss reducing agent, 3.2 parts per hundred parts resin (phr) of titanium dioxide as pigment and low levels of customary lubricant and stabilizing additives. Said crosslinked SAN polymers are described, for example, in U.S. Pat. Nos. 5,580,924 and 5,965,665. Impact strength results for the molded test specimens in Table 2 show that there is a decrease in both Notched Izod impact strength and Dynatup impact strength with decreasing graft efficiency onto rubber substrate.

Additional results showing the reduction in impact strength with reduction in graft efficiency are shown in Table 3. All formulations in Table 3 incorporated 5 phr of titanium dioxide as pigment, and minor amounts of lubricants, UV stabilizers and antioxidants. For entry 1 of the table a control ASA formulation was used containing 40 wt. % bulk SAN (72:28 ratio of S:AN) and 60 wt. % of styrene-acrylonitrile grafted PBA (comprising about 45% PBA) to achieve a 27% loading of PBA rubber in the formulation. The control ASA formulation comprised a broad PBA rubber particle size distribution and a 2:1 (wt/wt) S:AN monomer mixture grafted onto PBA rubber substrate (referred to hereinafter as "ASA-HRG").

Entry 1 showed a high ASTM notched Izod impact strength and ductile Dynatup impact behavior. Entry 2 used a bimodal grafted PBA system. In particular, two ASA's were made with approximately 3:1 (wt/wt) ratio of S:AN monomer mixture grafted onto PBA rubber substrates of 100 nm and 450 nm mean particle size, and blended in a 75:25 ratio, respectively. The notched Izod impact strength for entry 2 was reduced somewhat compared to that for the control formulation, entry 1, but good Dynatup impact strength was maintained. When this same bimodal grafted PBA system comprised grafted copolymer derived from a monomer composition of 45 MMA/40 S/15 AN (wt./wt./wt.), the notched Izod impact strength decreased further while Dynatup impact strength also decreased sharply (entry 3).

TABLE 3

| Entry | Comments | N. Izod Impact (J/m) | Dynatup Impact Total Energy (Joules) |
|---|---|---|---|
| 1 | Control ASA; broad rubber particle size | 437 | 43 |
| 2 | bimodal rubber particle size; SAN graft | 176 | 43 |
| 3 | bimodal rubber particle size; MMASAN graft | 117 | 28 |

EXAMPLES 1–6 AND COMPARATIVE EXAMPLES 1–3

The following examples illustrate staged feeding of monomers for grafting. Agitated reaction mixtures comprising 212.8 parts demineralized water and 45 parts of a PBA with broad particle size distribution were heated to 60° C. Various amounts of a monomer mixture consisting of styrene and acrylonitrile (2:1 wt/wt ratio) were fed to each reaction in a first stage while various amounts of a monomer mixture consisting of styrene, acrylonitrile and methyl methacrylate (40:25:35 wt/wt/wt ratio) were fed to each reaction in a second stage. The monomer feed times were adjusted according to the relative amounts of monomer being fed so as to keep the overall monomer flow rates constant at 55 parts total monomer being added continuously over 90 minutes. In addition 0.225 parts cumene hydroperoxide and an activator solution of 5 parts demineralized water, 0.0033 parts ferric sulfate heptahydrate, 0.3 parts sodium formaldehyde sulfoxylate and 0.0165 parts disodium salt of ethylene diamine tetraacetic acid were fed continuously to each reaction mixture over 125 minutes. Table 4 shows the parts by weight of monomer fed to each reaction mixture.

TABLE 4

|  | Example | | | | |
|---|---|---|---|---|---|
|  | 1 | 2 | 3 | 4 | 5 |
| 1st Stage monomer | | | | | |
| styrene | 6.11 | 12.22 | 18.34 | 24.45 | 30.56 |
| acrylonitrile | 3.06 | 6.11 | 9.17 | 12.22 | 15.28 |
| 2nd Stage monomer | | | | | |
| styrene | 18.33 | 14.67 | 11 | 7.33 | 3.67 |
| acrylonitrile | 11.46 | 9.17 | 6.87 | 4.58 | 2.29 |
| methyl methacrylate | 16.04 | 12.83 | 9.62 | 6.42 | 3.21 |

Samples were taken from each reaction mixture during reaction. Samples and the final product comprising rigid thermoplastic phase and grafted rubber substrate were coagulated with aqueous calcium chloride and dried in a fluid bed dryer at 70° C. Samples and final product were analyzed for level of grafting by treatment with acetone to determine wt. % gel.

Figure 1:
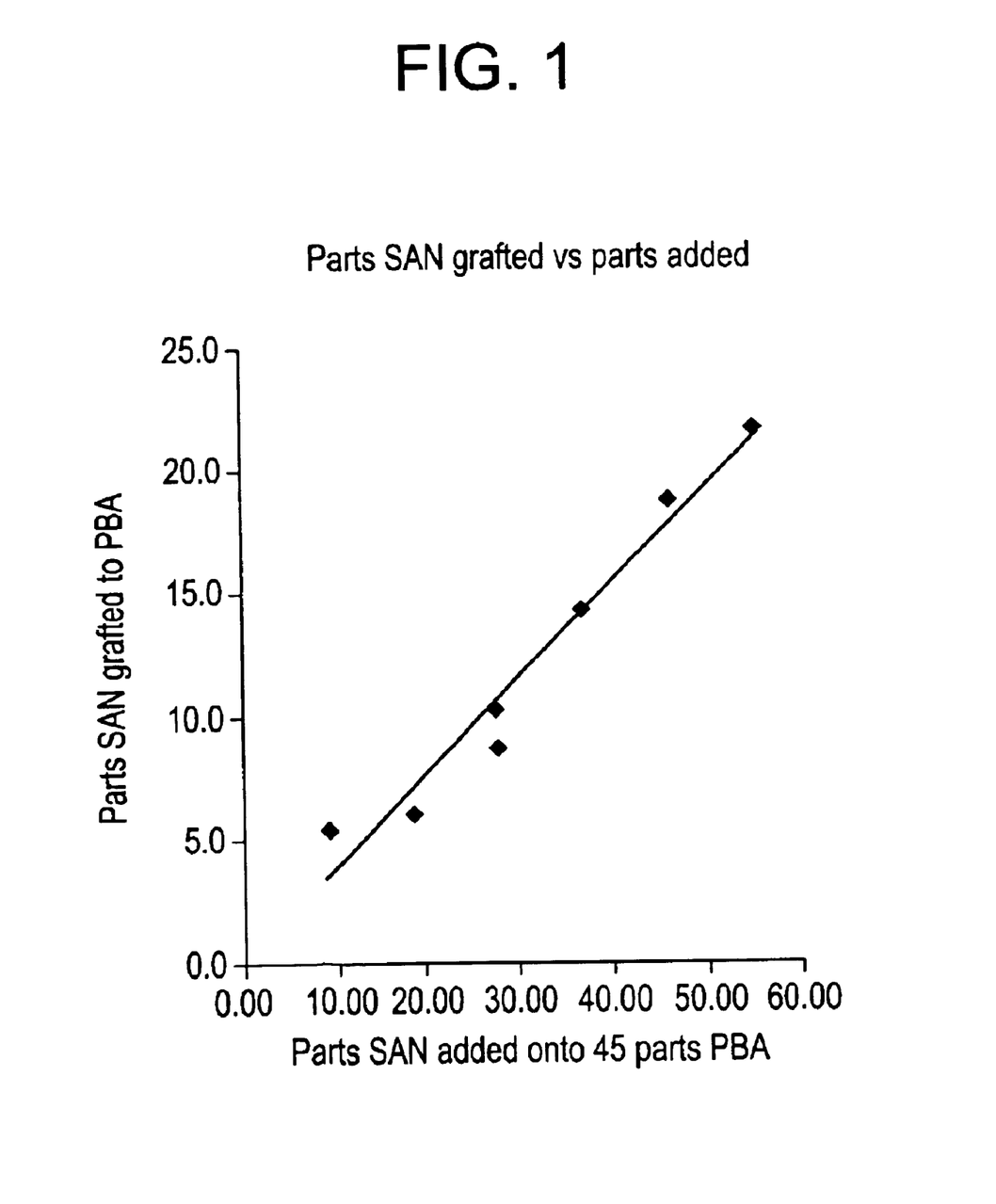
FIG. 1 shows parts SAN grafted to rubber substrate versus parts SAN added during graft polymerization.

FIG. 1 shows values for wt. % gel determined for samples from each reaction mixture at the end of the first stage of grafting with a monomer mixture consisting of styrene and acrylonitrile. The data point at 55 parts SAN represents a comparison reaction in which the entirety of grafting was performed with 2:1 (wt/wt) S:AN with no methyl methacrylate added. This comparison data point was taken as the maximum efficiency to be expected from the graft reaction. The data show that the amount of grafting to PBA increases with the amount of SAN fed at the first grafting stage, and that at any particular point about 40% of the SAN feed undergoes graft reaction to rubber substrate.

Figure 2:
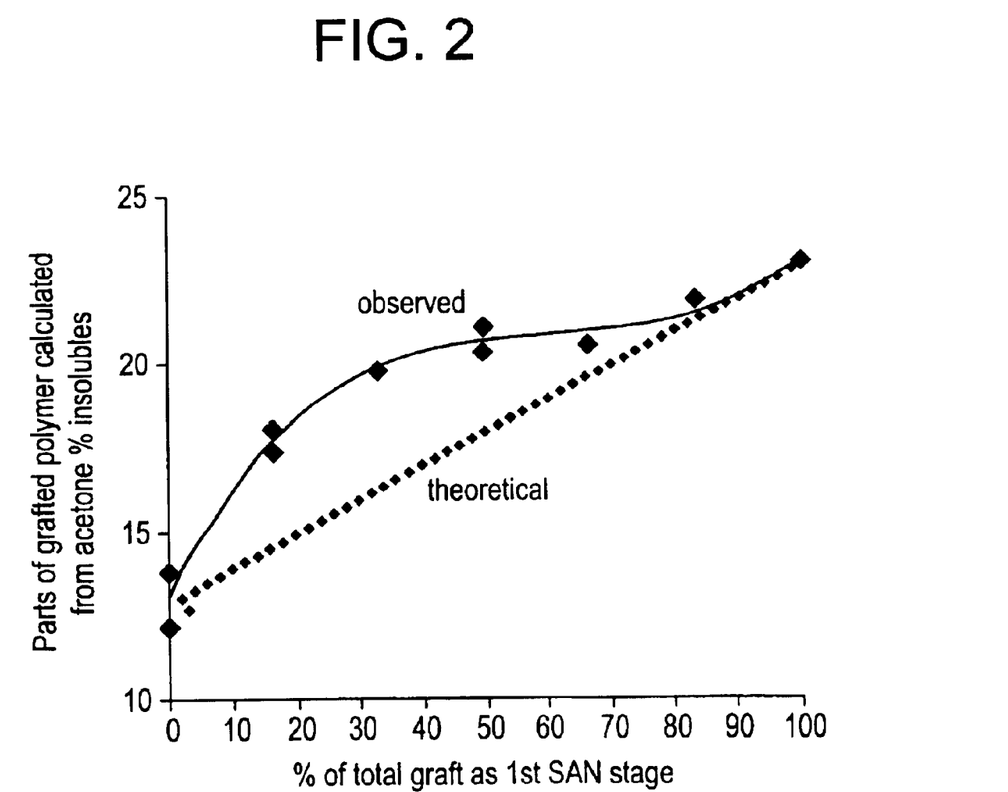
FIG. 2 shows calculated and found values for parts polymer grafted to a rubber substrate as a function of wt. % of total graft monomer included in a first graft stage.

FIG. 2 shows values for wt. % gel determined for the final products from each grafting reaction (i.e. at the completion of both stages of grafting) plotted against wt. % of total graft monomer included in the SAN first graft stage. For comparison a calculated line is shown representing the expected amount of grafted polymer as a function of % of total graft as first SAN stage. The expected amount of grafted polymer was calculated by adding the proportionate amount of polymer expected from grafting 100% SAN in the first stage (a percentage of the value shown at 100% of total graft as first SAN stage in which no MMA was included) to the proportionate amount of polymer expected from grafting 35/40/25 MMA:S:AN without any first stage grafting of SAN alone (a percentage of the value shown at 0% of total graft as first SAN stage). Surprisingly, the data show that the amount of grafting obtained is not the expected linear combination of grafting amounts but, instead, the amount of MMASAN grafted in the second stage is enhanced by the presence of a process step in which a portion of SAN is grafted in a first stage.

In addition, comparative examples were run employing a common graft polymerization process in which 45 parts by weight of a poly(butyl acrylate) (PBA) rubber substrate was grafted in two stages with 55 parts by weight of a monomer mixture comprising various % ratios (wt./wt./wt. totaling 100) of styrene-acrylonitrile-methyl methacrylate. The rubber substrate in each case was prepared by a continuous procedure and comprised a broad rubber particle size distribution. Table 5 shows the amounts of styrene, acrylonitrile and methyl methacrylate employed in each graft reaction at each stage and characterization data for the resulting product. Viscosities were determined at various shear rates using a Kayeness capillary rheometer under conditions of 260° C. melt temperature.

TABLE 5

|  | Example | | | |
|---|---|---|---|---|
|  | C. Ex 1 | C. Ex 2 | C. Ex 3 | Ex 6 |
| 1st Stage monomer | | | | |
| Parts styrene | 12.1 | 12.1 | 16.59 | 20.27 |
| Parts acrylonitrile | 4.54 | 4.54 | 7.53 | 9.98 |
| Parts MMA | 13.61 | 13.61 | 6.12 | 0 |
| 2nd Stage monomer | | | | |
| Parts styrene | 9.9 | 16.58 | 13.58 | 9.9 |
| Parts acrylonitrile | 3.71 | 8.17 | 6.16 | 3.71 |
| Parts MMA | 11.14 | 0 | 5.01 | 11.14 |
| Wt. % Gel in product | 55 | 60.6 | 60.6 | 64.6 |
| Swell index | 5.9 | 6.5 | 6.6 | 7.0 |
| Viscosity, Pa · s | | | | |
| at 1000 s$^{-1}$ | 195 | 240 | 229 | 240 |
| at 100 s$^{-1}$ | 1074 | 1393 | 1307 | 1367 |

Two stage grafting as in Example 6 of the invention gives a higher level of grafting as measured by wt. % gel in product than any of the Comparative Examples wherein the monomer mixture fed at the first stage comprised MMA.

Figure 3:
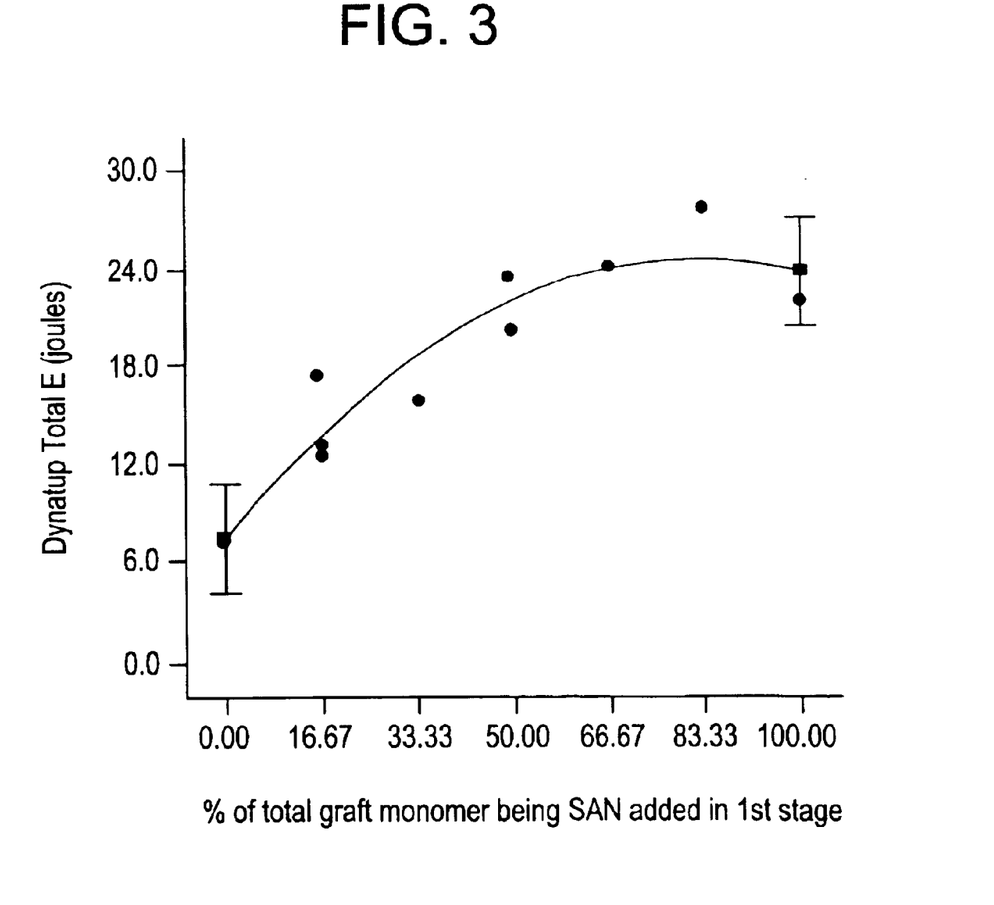
FIG. 3 shows Dynatup impact strength as a function of wt. % of total graft monomer included in a first graft stage.

The products of Examples 1–5 (59 parts by weight (pbw)) were formulated into molding compositions containing 36 pbw of a styrene-acrylonitrile-MMA resin (26 pbw styrene/24 pbw acrylonitrile/50 pbw MMA; prepared by a suspension polymerization process, sold as SR-06B by Ube Cycon Ltd.) along with 5 pbw of crosslinked SAN polymer, 3.2 phr of $TiO_2$ and low levels of customary lubricant and stabilizing additives. FIG. 3 shows Dynatup impact strength values for molded test specimens as a function of wt. % of total graft monomer included in the SAN first graft stage. A control blend of comparable composition but containing ASA-HRG (i.e. no MMA in graft) was included as the data point at 100% of total graft monomer being SAN grafted in the first stage. A second control blend of comparable composition but containing an MMASAN graft with a proportions of 35 MMA/40 styrene/25 acrylonitrile in the graft was included as the data point at 0% of total graft monomer being SAN grafted in the first stage. The impact strength values increase with increasing amount of SAN included in the first stage.

Figure 4:
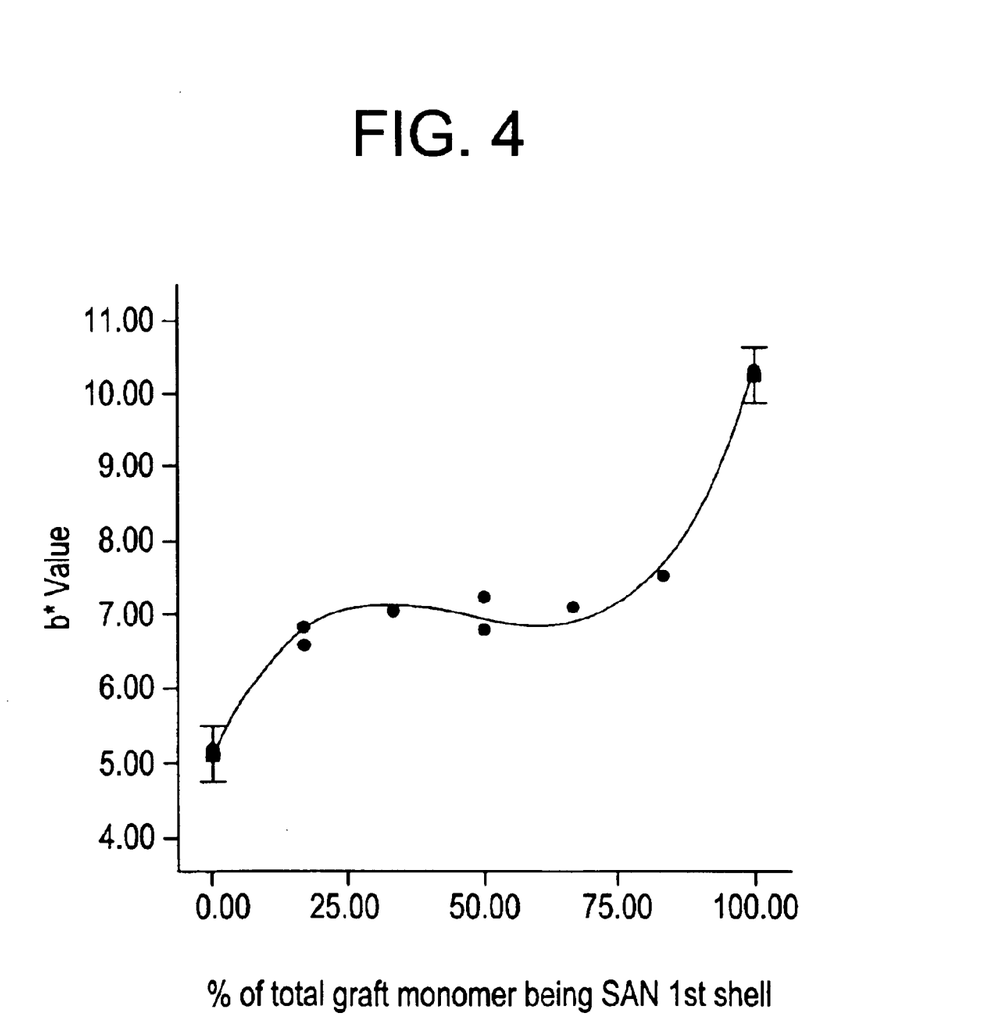
FIG. 4 shows CIELAB b* value as a function of wt. % of total graft monomer included in a first graft stage.

The molded test specimens above were also subjected to color measurements in the CIE L*a*b* space using a MacBeth 7000 instrument for color measurement. Values for "b*" are plotted in FIG. 4 versus wt. % of total graft monomer included in the SAN first graft stage. A higher (positive) value of delta b indicates a more pronounced color shift towards yellow. Molded parts of a control formulation of similar composition were prepared containing ASA-HRG (i.e. no MMA). As shown in FIG. 4 molded parts of the control composition containing graft copolymer with no MMA develop a yellow color during melt processing, leading to an increased "b*" value in the white pigmented formulation. Surprisingly, the samples containing graft copolymer comprising MMA display a much lower value for "b*" even when substantial amounts of the graft copolymer are incorporated as SAN in the first stage of the graft reaction.

EXAMPLE 7 AND COMPARATIVE EXAMPLE 4

Figure 5:
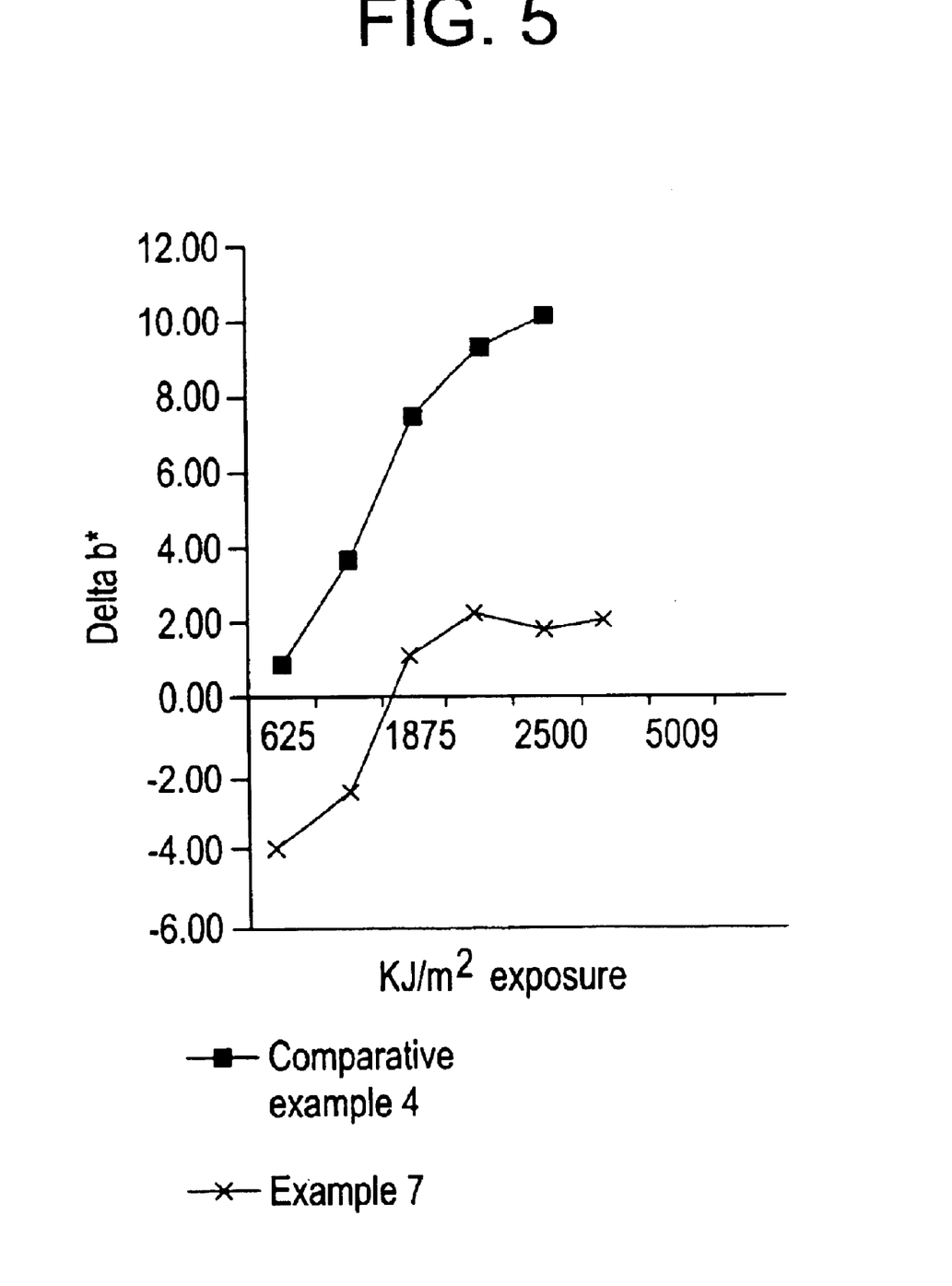
FIG. 5 shows the results of an accelerated weathering test on a formulation comprising a composition of the invention compared to a control formulation.

Molded test parts for the comparative example were prepared containing 34.5 pbw SAN (S:AN ratio 72/28) and 59 pbw ASA-HRG along with 6.5 pbw crosslinked SAN polymer, 3.2 pbw titanium dioxide and 2.25 pbw of additives including stabilizers, antioxidants, lubricants and surfactants. Molded test parts were also prepared with the same composition except that 59 pbw MMA-SAN graft to PBA (MMA:S:AN ratio 45/40/15) was used in place of ASA-HRG, and 55% of SAN (2:1 S:AN) was grafted in a first stage to PBA followed by grafting of the remaining MMASAN monomer mixture. FIG. 5 shows the results of an accelerated weathering test performed on the two formulations according to the SAE J1960 test protocol using an Atlas Ci65a Xenon Arc weatherometer. Following accelerated weathering, the test parts were subjected to color measurements in the CIE L*a*b* space using a MacBeth 7000 instrument for color measurement. Values for "delta b*" are plotted in FIG. 5 versus kilojoules per square meter exposure in the weathering test. The data show that the composition containing MMA-SAN graft to PBA has greatly improved resistance to color formation compared to the control blend.

EXAMPLES 8–13

Compositions were prepared comprising 40 phr of a copolymer of 70% alpha-methylstyrene and 30% acrylonitrile; 15 phr of a copolymer of MMA-SAN (40 pbw styrene/ 25 pbw acrylonitrile/35 pbw MMA; prepared by a bulk polymerization process) and 45 phr of a copolymer derived from 2-stage grafting of MMA-SAN to PBA. The PBA employed was a blend of 100 nm mean particle size PBA and 500 nm mean particle size PBA in a 70:30 ratio, respectively. The amounts of MMA-SAN grafted to PBA in each of the 2 stages are shown in Table 6. Each of the compositions also contained 2 parts carbon black and low levels of customary lubricant and stabilizing additives. Table 6 also shows physical properties of molded test parts of the compositions. Viscosities were determined at various shear rates using a Kayeness capillary rheometer under conditions of 260° C. melt temperature. The test parts as molded were subjected to color measurements in the CIE L*a*b* space using a MacBeth 7000 instrument. Values for L* were measured with specular component excluded using measurement mode "DREOL" on the MacBeth instrument.

TABLE 6

| | Example | | | | | |
|---|---|---|---|---|---|---|
| | 8 | 9 | 10 | 11 | 12 | 13 |
| 1st Stage monomer | | | | | | |
| styrene | 20.44 | 20.44 | 20.44 | 21.96 | 21.96 | 21.96 |
| acrylonitrile | 10.07 | 10.07 | 10.07 | 8.54 | 8.54 | 8.54 |
| 2nd Stage monomer | | | | | | |
| styrene | 9.80 | 9.80 | 7.35 | 9.80 | 9.80 | 7.35 |
| acrylonitrile | 6.13 | 3.68 | 2.45 | 6.13 | 3.68 | 2.45 |
| methyl methacrylate | 8.58 | 11.03 | 14.70 | 8.58 | 11.03 | 14.70 |
| L* value | 7.9 | 6.8 | 7.0 | 6.3 | 5.9 | 6.2 |
| Notched Izod Impact (kJ/m$^2$) | 7.4 | 6.7 | 7.1 | 6.9 | 6.3 | 6.3 |
| Viscosity, Pa · s | | | | | | |
| at 1000 s$^{-1}$ | 231 | 219 | 224 | 210 | 205 | 205 |
| at 100 s$^{-1}$ | 976 | 888 | 928 | 835 | 830 | 842 |

Comparing Examples 8, 9 and 10 with Examples 11, 12 and 13, respectively, it can be seen that those compositions with 2.6:1 ratio of styrene to acrylonitrile in the first grafting stage (Examples 11, 12 and 13) have lower L* values, and, hence, better color properties than those compositions with 2:1 ratio of styrene to acrylonitrile in the first grafting stage (Examples 8, 9 and 10).

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All Patents and patent applications cited herein are incorporated herein by reference.

What is claimed is:

1. A method for preparing an acrylonitrile-styrene-acrylate (ASA) type resin comprising a discontinuous elastomeric phase dispersed in a rigid thermoplastic phase, wherein at least a portion of the rigid thermoplastic phase is grafted to the elastomeric phase and wherein the elastomeric phase comprises a polymer having structural units derived from at least one ($C_1$–$C_{12}$)alkyl(meth)acrylate monomer, which comprises the steps of:
   (a) polymerizing mixture of monomers in a first stage in the presence of the elastomeric phase, at least one of which monomers is selected from the group consisting of vinyl aromatic monomers and at least one of which monomers is selected from the group consisting of monoethylenically unsaturated nitrile monomers, followed by
   (b) polymerizing a mixture of monomers in at least one subsequent stage in the presence of the elastomeric phase from (a), wherein the monomers comprise at least one vinyl aromatic monomer, at least one monoethylenically unsaturated nitrile monomer, and at least one monomer selected from the group consisting of ($C_1$–$C_{12}$)alkyl- and aryl-(meth)acrylate monomers.

2. The method of claim 1, wherein the alkyl(meth)acrylate monomer is butyl acrylate.

3. The method of claim 1, wherein the polymer of the elastomeric phase further comprises structural units derived from at least one polyethylenically unsaturated monomer.

4. The method of claim 3, wherein the polyethylenically unsaturated monomer is selected from the group consisting of butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylisocyanurate, triallylcyanurate, the acrylate of tricyclodecenylalcohol and mixtures thereof.

5. The method of claim 1, wherein the elastomeric phase comprises about 10 to about 80 percent by weight of the ASA type resin.

6. The method of claim 1, wherein the elastomeric phase comprises about 35 to about 80 percent by weight of the ASA type resin.

7. The method of claim 1, wherein the elastomeric phase initially comprises particles selected from the group consisting of a mixture of particles sizes with at least two mean particle size distributions and a broad size distribution having particles ranging in size from about 50 nm to about 1000 nm.

8. The method of claim 7, wherein the at least two mean particle size distributions are each in a range of between about 80 nm and about 500 nm.

9. The method of claim 1, wherein at least about 5 weight % to about 90 weight % of rigid thermoplastic phase is chemically grafted to the elastomeric phase, based on the total amount of rigid thermoplastic phase in the composition.

10. The method of claim 1, wherein the mixture of monomers in the first stage comprises styrene and acrylonitrile, or alpha-methyl styrene and acrylonitrile or a mixture of styrene, alpha-methyl styrene and acrylonitrile.

11. The method of claim 10, wherein the wt./wt. ratio of styrene, alpha-methyl styrene or mixture thereof to acrylonitrile is in a range of between about 1.5:1 and about 4:1.

12. The method of claim 10, wherein the wt./wt. ratio of styrene, alpha-methyl styrene or mixture thereof to acrylonitrile is in a range of between about 2:1 and about 3:1.

13. The method of claim 10, wherein the wt./wt. ratio of styrene, alpha-methyl styrene or mixture thereof to acrylonitrile is about 2.6:1.

14. The method of claim 1, wherein the mixture of monomers in the first stage is employed in an amount in a range of between about 15 wt. % and about 98 wt. % based on the total weight of monomer employed in all stages.

15. The method of claim 1, wherein the mixture of monomers in the first stage is employed in an amount in a range of between about 15 wt. % and about 85 wt. % based on the total weight of monomer employed in all stages.

16. The method of claim 1, wherein in step (b) the monomer mixture comprises methyl methacrylate.

17. The method of claim 16, wherein the wt./wt. ratio of methyl methacrylate to the total of vinyl aromatic monomer and monoethylenically unsaturated nitrile monomer is in a range of between about 3:1 and about 1:3.

18. The method of claim 16, wherein the monomer is a mixture comprising styrene and acrylonitrile.

19. The method of claim 1, further comprising the step of combining the ASA type resin with rigid thermoplastic phase prepared in a separate polymerization step.

20. The method of claim 19, wherein the rigid thermoplastic phase is a styrene-acrylonitrile copolymer.

21. The method of claim 19, wherein the rigid thermoplastic phase is a styrene-acrylonitrile-methyl methacrylate copolymer.

22. The method of claim 19, wherein the rigid thermoplastic phase separately prepared is combined at a level of between about 30 wt. % and about 80 wt. % based on the weight of the entire composition.

23. The method of claim 1, wherein the ASA type resin further comprises an additive selected from the group consisting of colorants, dyes, pigments, lubricants, stabilizers, fillers and mixtures thereof.

24. A method for preparing an acrylonitrile-styrene-acrylate (ASA) type resin comprising about 35 to about 70 wt. % based on the total weight of the resin of an elastomeric phase comprising structural units derived from butyl acrylate, wherein the elastomeric phase is dispersed in a rigid thermoplastic phase, and wherein at least a portion of the rigid thermoplastic phase is grafted to the elastomeric phase, which comprises the steps of:
(a) polymerizing in a first stage in the presence of the elastomeric phase a monomer mixture of styrene and acrylonitrile in a wt./wt. ratio of about 2.6:1, wherein the amount of monomer mixture employed is in a range of between about 15 wt. % and about 85 wt. % based on the total weight of monomer employed in all stages, followed by
(b) polymerizing in a second stage in the presence of the elastomeric phase from (a), a mixture of styrene, acrylonitrile and methyl methacrylate, wherein styrene and acrylonitrile are employed in a wt./wt. ratio in a range of between about 1.5:1 and about 4:1, and the wt./wt. ratio of methyl methacrylate to the total of styrene and acrylonitrile is in a range of between about 3:1 and about 1:3.

25. The method of claim 24, further comprising the step of combining the ASA type resin with rigid thermoplastic phase prepared in a separate polymerization step.

26. The method of claim 25, wherein the rigid thermoplastic phase is a styrene-acrylonitrile copolymer.

27. The method of claim 25, wherein the rigid thermoplastic phase is a styrene-acrylonitrile-methyl methacrylate copolymer.

28. The method of claim 25, wherein the rigid thermoplastic phase separately prepared is combined at a level of between about 30 wt. % and about 80 wt. % based on the weight of the entire composition.

29. The method of claim 24, wherein the ASA type resin further comprises an additive selected from the group consisting of colorants, dyes, pigments, lubricants, stabilizers, fillers and mixtures thereof.

30. An acrylonitrile-styrene-acrylate (ASA) type resin composition comprising a discontinuous elastomeric phase dispersed in a rigid thermoplastic phase, wherein at least a portion of the rigid thermoplastic phase is grafted to the elastomeric phase and wherein the elastomeric phase comprises a polymer having structural units derived from at least one $(C_1$–$C_{12})$alkyl(meth)acrylate monomer, which is prepared by a method comprising the steps of:
(a) polymerizing a mixture of monomers in a first stage in the presence of the elastomeric phase, at least one of which monomers is selected from the group consisting of vinyl aromatic monomers and at least one of which monomers is selected from the group consisting of monoethylenically unsaturated nitrile monomers, followed by
(b) polymerizing a mixture of monomers in at least one subsequent stage in the presence of the elastomeric phase from (a), wherein the monomers comprise at least one vinyl aromatic monomer, at least one monoethylenically unsaturated nitrile monomer, and at least one monomer selected from the group consisting of $(C_1$–$C_{12})$alkyl- and aryl-(meth)acrylate monomers.

31. The composition of claim 30, wherein the alkyl(meth) acrylate monomer is butyl acrylate.

32. The composition of claim 30, wherein the polymer of the elastomeric phase further comprises structural units derived from at least one polyethylenically unsaturated monomer.

33. The composition of claim 32, wherein the polyethylenically unsaturated monomer is selected from the group consisting of butylene diacrylate, divinyl benzene, butene diol dimethacrylate, trimethylolpropane tri(meth)acrylate, allyl methacrylate, diallyl methacrylate, diallyl maleate, diallyl fumarate, diallyl phthalate, triallyl methacrylate, triallylisocyanurate, triallylcyanurate, the acrylate of tricyclodecenylalcohol and mixtures thereof.

34. The composition of claim 30, wherein the elastomeric phase comprises about 10 to about 80 percent by weight of the ASA type resin.

35. The composition of claim 30, wherein the elastomeric phase comprises about 35 to about 80 percent by weight of the ASA type resin.

36. The composition of claim 30, wherein the elastomeric phase initially comprises particles selected from the group consisting of a mixture of particles sizes with at least two mean particle size distributions and a broad size distribution having particles ranging in size from about 50 nm to about 1000 nm.

37. The composition of claim 36, wherein the at least mean particle size distributions are each in a range of between about 80 nm and about 500 nm.

38. The composition of claim 30, wherein at least about 5 weight % to about 90 weight % of rigid thermoplastic phase is chemically grafted to the elastomeric base, based on the total amount of rigid thermoplastic phase in the composition.

39. The composition of claim 30, wherein the mixture of monomers in the first stage comprises styrene and acrylonitrile, or alpha-methyl styrene and acrylonitrile or a mixture of styrene, alpha-methyl styrene and acrylonitrile.

40. The composition of claim 39, wherein the wt./wt. ratio of styrene, alpha-methyl styrene or mixture thereof to acrylonitrile is in a range of between about 1.5:1 and about 4:1.

41. The composition of claim 39, wherein the wt./wt. ratio of styrene, alpha-methyl styrene or mixture thereof to acrylonitrile is in a range of between about 2:1 and about 3:1.

42. The composition of claim 39, wherein the wt./wt. ratio of styrene, alpha-methyl styrene or mixture thereof to acrylonitrile is about 2.6:1.

43. The composition of claim 30, wherein the mixture of monomers in the first stage is employed in an amount in a range of between about 5 wt. % and about 98 wt. % based on the total weight of monomer employed in all stages.

44. The composition of claim 30, wherein the mixture of monomers in the first stage is employed in an amount in a range of between about 15 wt. % and about 85 wt. % based on the total weight of monomer employed in all stages.

45. The composition of claim 30, wherein in step (b) the monomer mixture comprises methyl methacrylate.

46. The composition of claim 45, wherein the wt./wt. ratio of methyl methacrylate to the total of vinyl aromatic monomer and monoethylenically unsaturated nitrile monomer is in a range of between about 3:1 and about 1:3.

47. The composition of claim 45, wherein the monomer is a mixture comprising styrene and acrylonitrile.

48. The composition of claim 30, further comprising rigid thermoplastic phase prepared in a separate polymerization step.

49. The composition of claim 48, wherein the rigid thermoplastic phase is a styrene-acrylonitrile copolymer.

50. The composition of claim 48, wherein the rigid thermoplastic phase is a styrene-acrylonitrile-methyl methacrylate copolymer.

51. The composition of claim 48, wherein the rigid thermoplastic phase separately prepared is present at a level of between about 30 wt. % and about 80 wt. % based on the weight of the entire composition.

52. The composition of claim 30, further comprising an additive selected from the group consisting of colorants, dyes, pigments, lubricants, stabilizers, fill and mixtures thereof.

53. An acrylonitrile-styrene-acrylate (ASA) type resin composition comprising about 35 to about 70 wt. % based on the total weight of the resin of an elastomeric phase comprising structural units derived from butyl acrylate, wherein the elastomeric phase is dispersed in a rigid thermoplastic phase, and wherein at least a portion of the rigid thermoplastic phase is grafted to the elastomeric phase, which is prepared by a method comprising the steps of:

(a) polymerizing in a first stage in the presence of the elastomeric phase a monomer mixture of styrene and acrylonitrile in a wt./wt. ratio of about 2.6:1, wherein the amount of monomer mixture employed is in a range of between about 15 wt. % and about 85 wt. % based on the total weight of monomer employed in all stages, followed by (b) polymerizing in a second stage in the presence of the elastomeric phase from (a), a mixture of styrene, acrylonitrile and methyl methacrylate, wherein styrene and acrylonitrile are employed in a wt./wt. ratio in a range of between about 1.5:1 and about 4:1, an the wt./wt. ratio of methyl methacrylate to the total of styrene and acrylonitrile is in a range of between about 3:1 and about 1:3.

54. The composition of claim 53, further comprising rigid thermoplastic phase prepared in a separate polymerization step.

55. The composition of claim 54, wherein the rigid thermoplastic phase is a styrene-acrylonitrile copolymer.

56. The composition of claim 54, wherein the rigid thermoplastic phase is a styrene-acrylonitrile-methyl methacrylate copolymer.

57. The composition of claim 54, wherein the rigid thermoplastic phase separately prepared is present at a level of between about 30 wt. % and about 80 wt. % based on the weight of the entire composition.

58. The composition of claim 53, further comprising an additive selected from the group consisting of colorants, dyes, pigments, lubricants, stabilizers, fillers and mixtures thereof.

* * * * *